Figure 1:
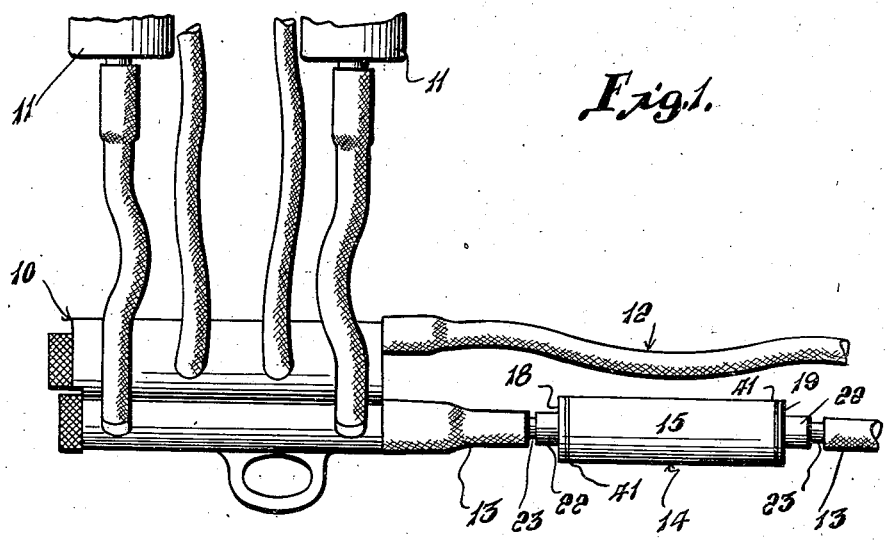

Dec. 26, 1939. C. B. WIER 2,184,761
DEVICE FOR MILKING MACHINES
Filed March 17, 1938

Inventor
Charlie B. Wier
By L. T. Randolph
Attorney

Patented Dec. 26, 1939

2,184,761

UNITED STATES PATENT OFFICE 2,184,761

DEVICE FOR MILKING MACHINES

Charlie Boyd Wier, Pineville, La.

Application March 17, 1938, Serial No. 196,559

7 Claims. (Cl. 210—166)

This invention relates to a safety device adapted to be used with any conventional form of milking machine to prevent the passage of impure milk to the milk receiving container.

More particularly it is an object of this invention to provide a device adapted to be mounted in the milk line and to be actuated by contact with impurities in the milk to shut-off the passage of the milk, thereby preventing contamination of that part of the milk already in the container, and likewise indicating the existence of disease in the cow to which the machine is attached.

It is a further aim of this invention to provide a device containing a filter and a valve, said filter adapted to permit the passage of pure milk but to resist the passage of impure milk, and to be actuated thereby to close the valve to shut-off the milk line.

Other objects and advantages of the invention will hereinafter become more fully apparent from the following description of the drawing which illustrates a preferred form of the invention, and wherein:—

Figure 2:
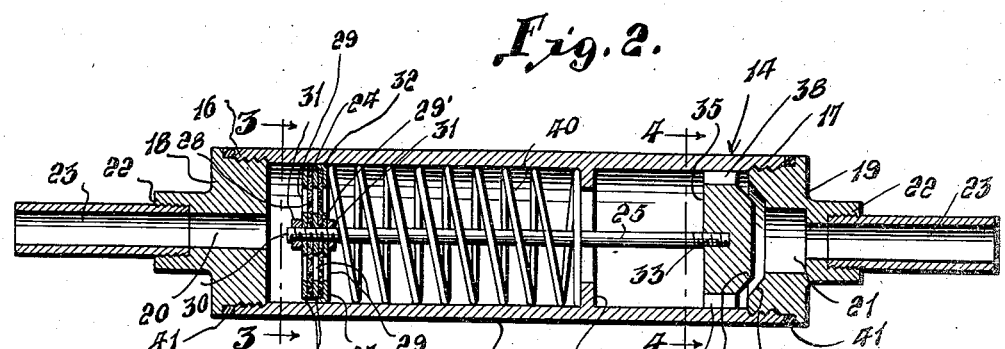
Figure 3:
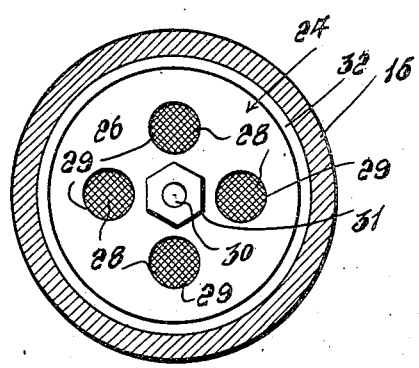
Figure 4:
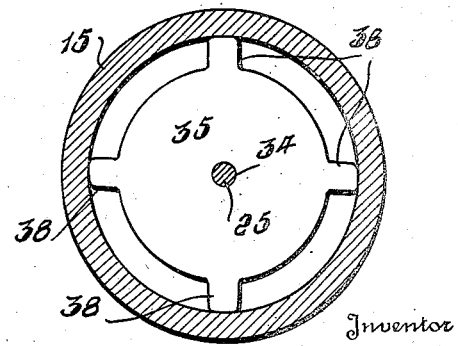

Figure 1 is a side elevational view of a portion of a conventional milking machine showing the invention attached thereto, Figure 2 is an enlarged longitudinal central sectional view of the device, Figure 3 is a cross sectional view taken on the line 3—3 of Figure 2, and Figure 4 is a cross sectional view on the line 4—4 of Figure 2.

Referring more particularly to the drawing wherein like reference characters designate like or corresponding parts throughout the different views, 10 designates generally a portion of a milking machine, of conventional form and shown merely to illustrate the application of the invention which will hereinafter be described. The machine 10 includes the teat cups shown fragmentarily at 11, the air pipe 12 connected to a source of vacuum, and the milk pipe 13 leading to any suitable milk receptacle, not shown, and having mounted therein the device 14, as shown in Figure 1, forming this invention.

This invention designated generally 14 is adapted to be mounted in the milk line to prevent the passage of impure milk from the cups 11 to the milk receptacle, not shown. The invention comprises a cylindrical hollow casing 15 which is internally threaded at each end as indicated at 16 and 17, to receive the plugs 18 and 19, respectively, provided with the bores 20 and 21 communicating with the interior of the casing 15. Plugs 18 and 19 are each provided with an internally threaded teat 22, which communicates with the bores 20 and 21, and which are adapted to receive the threaded ends of the short sections of pipe 23. The adjacent ends of the milk line or pipe 13, which is preferably formed of flexible tubing, are adapted to be stretched over and into engagement with the pipes 23 as best seen in Figure 1 to mount the attachment 14 in the milk line between the milker 10 and the milk receiving receptacle, which is not shown.

A filter designated generally 24 and mounted on a rod 25, is slidably mounted in one end of the casing 15. The filter 24 comprises two disks 26 and the disk 27 between which are mounted the fine wire mesh fabric 28. The disks 26 and 27 are provided with a plurality of aligned radially disposed openings 29, through which the liquid passing through cylinder 15 may pass, and the central opening 29' to receive the threaded end 30 of the rod 25. Nuts 31 engage the threaded end 30 and the opposite side of the filter 24 to hold the disks and mesh fabric in assembled position. The disk 27 is provided with an annular flange 32 adapted to engage the wall of the casing 15 to prevent the liquid from passing around the filter 24.

The opposite threaded end 33 of rod 25 engages a threaded opening 34 in the back face of a valve 35. The opposite side of valve 35 is provided with a cylindrical tapered portion 36 adapted to engage a valve seat 37 formed in the inner face of the plug 19 and communicating with the bore 21. Valve 35 is provided with a plurality of spaced ears 38 to engage the wall of casing 15 to provide a guide for the valve, and to permit liquid to pass between the periphery of the valve and the wall of the casing. Casing 15 has an annular inwardly projecting shoulder 39, intermediate of its ends, forming a seat for one end of an expansive coil spring 40, the opposite end of which engages the filter 24 to urge it toward plug 18, sufficiently to hold portion 36 out of engagement with the valve seat 37 to permit liquid to flow through the casing 15. Gaskets 41 may be mounted between the ends of casing 15 and the plugs 18 and 19 to provide a liquid-tight seal.

From the foregoing it will be seen that when the milking machine 10 forces the milk through pipe 13, it will pass through the casing 15 which is mounted in this pipe. The milk will enter the casing 15 through bore 20 in plug 18 and will then filter through openings 29 and through the mesh fabric 28 covering these openings, and hence through the remainder of casing 18 and around the valve 35, through bore 21, the pipe 23 communicating therewith, and back into the other section of pipe 13 and hence to the milk receptacle, not shown. Coil spring 40 is of sufficient strength to withstand the normal pressure of the milk to prevent it from closing valve 35, but should the milk from any particular cow be diseased so as to contain blood clots, garget or the like, the mesh wire fabric 28 will be too fine to permit the passage of such impurities, so that the pressure will be built up against the filter 24 to cause it to move against the action of spring 40 seating valve 35 in valve seat 37 and shutting off the passage of milk so that that portion already in the milk receptacle will not be contaminated and indicating by stopping the operation of the milker that the cow being milked is diseased.

Various modifications and changes in the construction of the filter as well as the operation of the shut-off valve may obviously be made and are contemplated, and the right is expressly reserved to make such changes and modifications as do not depart from the spirit and scope of the invention as hereinafter defined by the claims.

I claim as my invention:

1. A device of the class described comprising a housing having an inlet and an outlet end, a valve seat formed in the outlet end of said housing, a rod slidably mounted in said housing, a sieve member forming a partition adjacent said inlet end of the housing, said sieve member being carried by one end of said rod, a valve mounted on the opposite end of said rod and adapted to seat in said valve seat, and spring means normally holding said valve out of engagement with its seat to permit passage of a liquid therethrough, said sieve member being actuated by the pressure of the liquid, containing impurities, to close the valve against the action of said spring.

2. In a sanitary attachment for milking machines, a cylindrical member having an inlet and an outlet end and adapted to be mounted in the milk pipe, a rod slidably mounted in said cylindrical member and having a filter mounted on one end to form a partition in said cylindrical member adjacent its inlet end through which the milk must pass, a valve mounted on the opposite end of said rod and adapted to seat in the outlet end of said cylindrical member to shut-off the passage of liquid therethrough, and spring means engaging said filter to normally hold the valve in an open position.

3. In a safety device for milking machines, a housing provided with an inlet and an outlet end and having a valve seat at its outlet end and adapted to be connected to a milk pipe, a rod, a filter mounted on one end of the rod and slidably mounted in said housing adjacent its inlet end to form a partition through which the milk must pass, a valve mounted on the opposite end of said rod to engage the valve seat to close the passage, and spring means normally holding said valve in an open position to permit the passage of milk therethrough, said filter being adapted to be actuated by impurities of the milk to close the valve to shut-off the passage of milk through the pipe.

4. In a device of the class described, a casing having an inlet and an outlet end and adapted to be mounted in a pipe line, a rod, a filter mounted on one end of the rod and slidably mounted in said casing and forming a partition adjacent its inlet end, a valve mounted on the opposite end of the rod and adapted to close said casing at its outlet end, and resilient means normally holding the valve in an open position to permit the passage of liquid through the filter and casing, said filter being of sufficiently fine mesh to prevent passage of impurities therethrough and to be actuated by the pressure of the impure liquid to move said valve into position to close the passage through the casing.

5. In an attachment for milking machines, a cylindrical housing having an inlet and an outlet end and adapted to be mounted in a milk conduit, said cylindrical housing being provided with a shut-off valve slidably mounted therein to seat in its outlet end, a filter mounted in said housing adjacent its inlet end and forming a partition, a rod connecting said valve and filter, and spring means normally holding said valve in an open position, said filter being adapted to be clogged by impurities in the milk and to be thereby actuated by the pressure of the milk to close said valve.

6. A filtering device comprising a tubular casing having an inlet and an outlet end, a valve slidably mounted in said casing to seat in and close its outlet end, a piston mounted in said casing adjacent its inlet end and provided with a plurality of screen covered openings forming passages for a liquid, a rod connecting said piston and valve, and yieldable means normally retaining said valve in an open position, said screen covered openings being adapted to resist the passage of impurities in a liquid whereby the pressure of the liquid will actuate said piston to move the valve to a closed position.

7. An attachment for liquid conduits comprising a tubular casing adapted to be mounted in a conduit and having an inlet and an outlet end, a valve slidably mounted in said casing to seat in and close the outlet end thereof, a filter mounted in said casing between the valve and the inlet end thereof and in contact with the inner wall of the casing, a rod connecting said filter and valve, and yieldable means normally holding said valve in an open position.

CHARLIE B. WIER.